April 10, 1928.
R. CRAIG
SCREW PRESS
Filed May 10, 1926
1,665,202
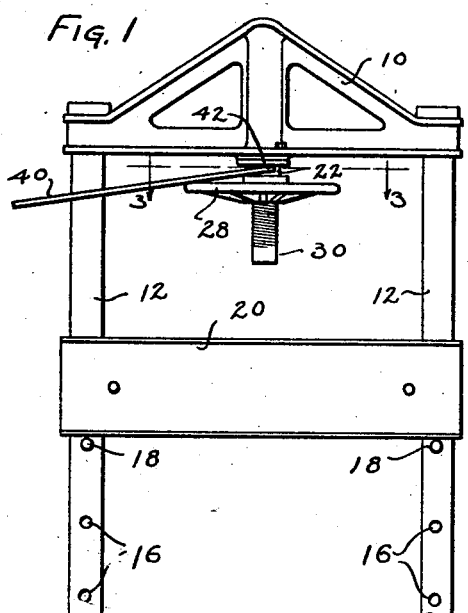
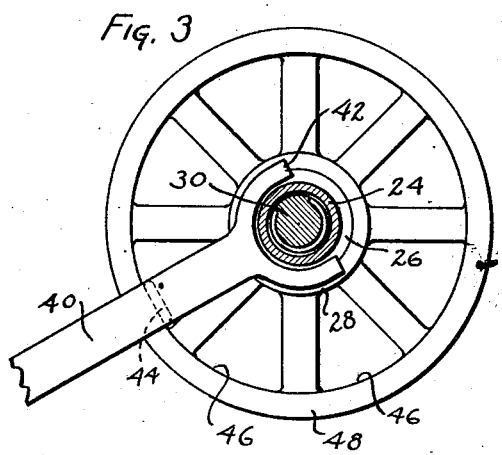
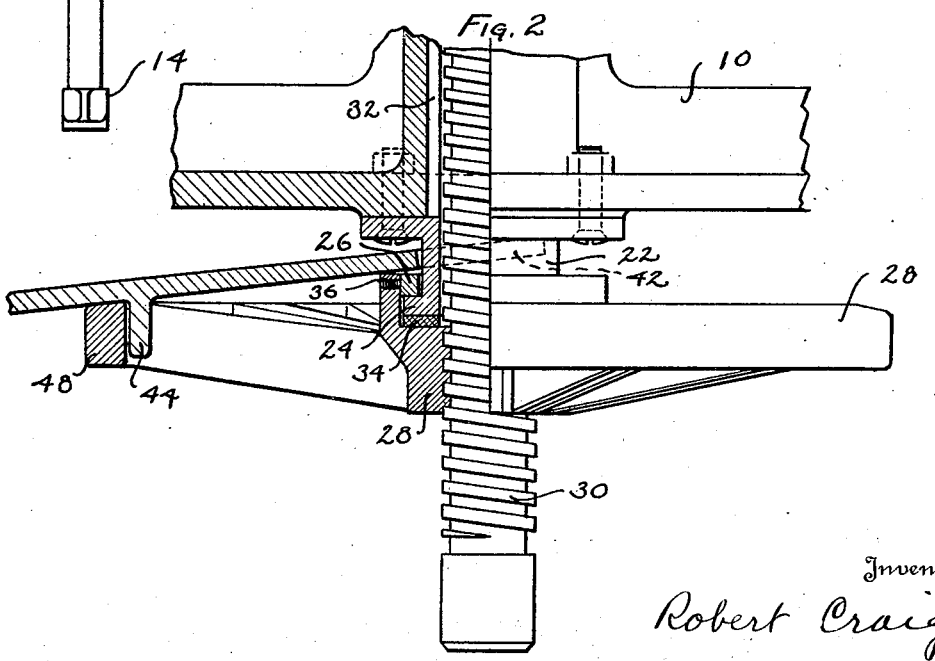
Inventor
Robert Craig
By Cooper, Kerr & Dunham
Attorneys Patented Apr. 10, 1928.

1,665,202

UNITED STATES PATENT OFFICE.

ROBERT CRAIG, OF DAYTON, OHIO.

SCREW PRESS.

Application filed May 10, 1926. Serial No. 107,910.

This invention is an improvement on the screw press disclosed in my Patent No. 1,358,418, issued November 9, 1920, and has for its principal object the provision of a wheel and lever system which will be safe and easy to operate, and which will be simple in construction, with no small or delicate parts.

Presses of this type are usually fitted with a hand wheel operating a vertical screw. When the wheel is rotated in one direction the screw is forced downwardly against work resting on the table or bolster. When the wheel is rotated in the other direction the screw is raised from the work.

When a heavy pressure on the work is required the effective radius of the hand wheel is increased by means of a horizontal lever engaging the wheel and extending radially from it.

The press is usually somewhat taller than the operator. The operating wheel is near the top of the machine, therefore when the operating lever projects horizontally from the wheel the lever is generally at or near the height of the operator's shoulder. Such a position is satisfactory enough so long as the work is light, but when a heavy pull is required the lever is too high to permit the operator to work to the best advantage.

Very light work is usually performed by the operator gripping the hand wheel itself without using the lever, but heavy work requires the use of the lever, and often requires the full strength of the operator exerted horizontally. I have therefore arranged my hand wheel and lever to bring the operating end of the lever to a convenient height for easy and powerful operation.

In the former construction the lever was fulcrumed on the hub of the wheel and pressed against one of a series of upstanding lugs on the rim of the wheel. Those lugs are a nuisance when the machine is operated by the hand wheel alone because they offer a rough jagged grip for the hand of the operator. The present design offers a smooth grip, thereby lessening wear and tear on the operator's hands.

In the former design there was nothing to prevent the lever moving radially outward, which sometimes resulted in the inner end of the lever slipping off the hub of the wheel while being operated, thereby resulting in injury to the operator. Also, if while the press was not in operation the lever were left in operative position on the wheel it would sooner or later fall off and possibly cause damage. The present design permits easy manipulation of the lever, with no possibility of the lever slipping out of proper position either while the machine is in use or idle.

The lever may be instantly engaged with or removed from the hand wheel.

The present design of wheel hub and its cooperating parts is particularly advantageous from the points of view of accessibility and ease of oiling the thrust bearings and screw.

In the drawings, which show what I now consider to be a preferred form of the invention:

Fig. 1 is a front view of the complete machine, except that one foot is broken off.

Fig. 2 is an enlarged view, partly in section, showing details of wheel and lever construction.

Fig. 3 is a plan view on line 3—3 of Fig. 1.

The head of the machine, designated 10, is of cast iron or steel and is supported on a pair of hollow cylindrical legs 12, the upper and lower ends of which are secured to the head 10 and feet 14 by the leaded construction disclosed in the above mentioned patent.

The legs are perforated by a series of horizontal holes 16 into any pair of which are inserted pins 18, upon which rests the table or bolster 20.

Secured to the under side of head 10 at its center is the downwardly projecting sleeve 22, provided at its lower end with a flange 24. Supported on flange 24 by means of split collar 26 is the hand wheel 28. The hub wheel 28 is threaded to cooperate with screw 30 which passes through the head upwardly into the hollow central portion of head 10. Screw 30 is prevented from turning relatively to head 10 by a horizontal pin through the upper end of the screw, which engages vertical slots 32 in head 10. A thrust collar 34 of bronze or other suitable material is provided between the upper surface of the wheel hub and the lower surface of sleeve 22.

Collar 26 is made in two or more sections so as to permit ready assembly of the parts. After the parts are in position collar 26 is secured by screws 36.

Screw 30 is prevented from turning; therefore, whenever wheel 28 is rotated, screw 30 is raised or lowered. Whenever screw 30 is not exerting downward pressure the weight of screw, wheel, and attached parts is carried by collar 26 which rests on flange 24, but when the lower end of screw 30 contacts with work supported on table 20, the screw and wheel are forced upwardly, raising collar 26 from flange 24 and causing the thrust to be taken on the upper and lower surfaces of thrust collar 34, against flange 24 and hub 28, respectively.

It will be noted that oil injected between collar 26 and sleeve 22 will find its way by gravity to all wearing surfaces, including the screw threads.

For light work the hand wheel alone is sufficient, but for heavy pressures additional leverage is necessary, so the extension lever 40 is provided. The inner end of the lever is fashioned with arcuate projections 42 which partially surround sleeve 22 when the lever is in operative position. Extending downwardly from the under side of lever 40 is a boss 44 which is so located as to enter any one of the openings 46 just inside the rim 48 of the wheel. Openings 46 may be simply spaces between adjacent spokes of the wheel, of if the wheel is provided with a disc-shaped web 50 instead of spokes, openings 46 may be formed through the web. In any event, the edges of opening 46 are so thickened and shaped as to provide a smooth comfortable surface for the operator's hand when the wheel is hand operated, and to also provide sufficient strength when the machine is lever operated. During lever operation boss 44 is moved from each opening 46 to the next, simply by raising lever 40 sufficiently to permit boss 44 to clear the intervening web or spoke. It is evident that the downward slant of lever 40 will tend to keep the outer side of boss 44 in contact with the inner surface of rim 48, and that rim 48 will always prevent the lever from being displaced radially outward from its operating position.

It is evident that whenever boss 44 is raised above the wheel rim, lever 40 may be removed from engagement with rim 48 and sleeve 22, or placed into engagement with those same parts. It is further evident that the weight of lever 40 will tend to always keep boss 44 in contact with the inner side of rim 48.

It is to be understood that the invention is not limited to the specific details herein illustrated and described, but can be embodied in other forms without departure from its spirit.

I claim—

1. In a screw press, in combination, a vertical screw, a hand wheel threaded on said screw, and a lever; said wheel being provided with a rim and a plurality of openings through the wheel adjacent the rim, said lever being provided with a boss normally extending downwardly through one of said openings; said wheel and lever being so arranged that the weight of the lever tends to maintain said boss in contact with said rim for the purpose described.

2. In a screw press, in combination, a vertical screw, a hand wheel threaded on said screw, a member supporting said screw and wheel, and a lever; said lever being provided with a bifurcated inner end member, and a downwardly extending projection; said wheel being provided with a plurality of openings therethrough; said member, wheel, and lever being so arranged that normally the bifurcated end of the lever engages said member and the downward projection of the lever enters an opening in the wheel, said projection serving the double purpose of turning said wheel when the lever is actuated, and of maintaining the lever in position when the machine is idle.

In testimony whereof I hereto affix my signature.

ROBERT CRAIG.